United States Patent [19]
De Puydt et al.

[11] 3,955,852
[45] May 11, 1976

[54] TRAILER HUB CAP DEVICE

[75] Inventors: Frank A. De Puydt; Eugene P. Conradi, both of Des Moines, Iowa

[73] Assignee: Dico Company, Inc., Des Moines, Iowa

[22] Filed: Feb. 10, 1975

[21] Appl. No.: 548,349

[52] U.S. Cl. ............................ 301/108 R; 301/125; 184/45 R; 308/93
[51] Int. Cl.² ........................................ B60B 27/00
[58] Field of Search ........ 301/105 R, 108 R, 124 R, 301/125; 308/92, 93, 95; 184/45 R

[56] References Cited
UNITED STATES PATENTS

| | | | |
|---|---|---|---|
| 1,454,922 | 5/1923 | Fesler | 184/45 R |
| 1,479,986 | 1/1924 | Fesler | 184/45 R |
| 3,077,948 | 2/1963 | Law | 184/45 R |
| 3,785,706 | 1/1974 | Vangalis | 184/45 R |

*Primary Examiner*—Robert B. Reeves
*Assistant Examiner*—D. W. Keen
*Attorney, Agent, or Firm*—Rudolph L. Lowell

[57] ABSTRACT

The hub cap device includes a cylindrical housing mountable on the trailer wheel hub and having a spring loaded piston that is movable between defined inner and outer positions. As the hub is filled with grease under pressure through a grease fitting on the piston, the piston is moved to its outer position wherein excess grease is bled to the atmosphere. A manually actuated control means on the hub cap device is adjustable to provide for the spring load being applied to urge the piston to the inner position therefor, when the trailer is to be used at a launching site, and for the spring load being removed from the piston when the trailer is to be used for road travel.

2 Claims, 6 Drawing Figures

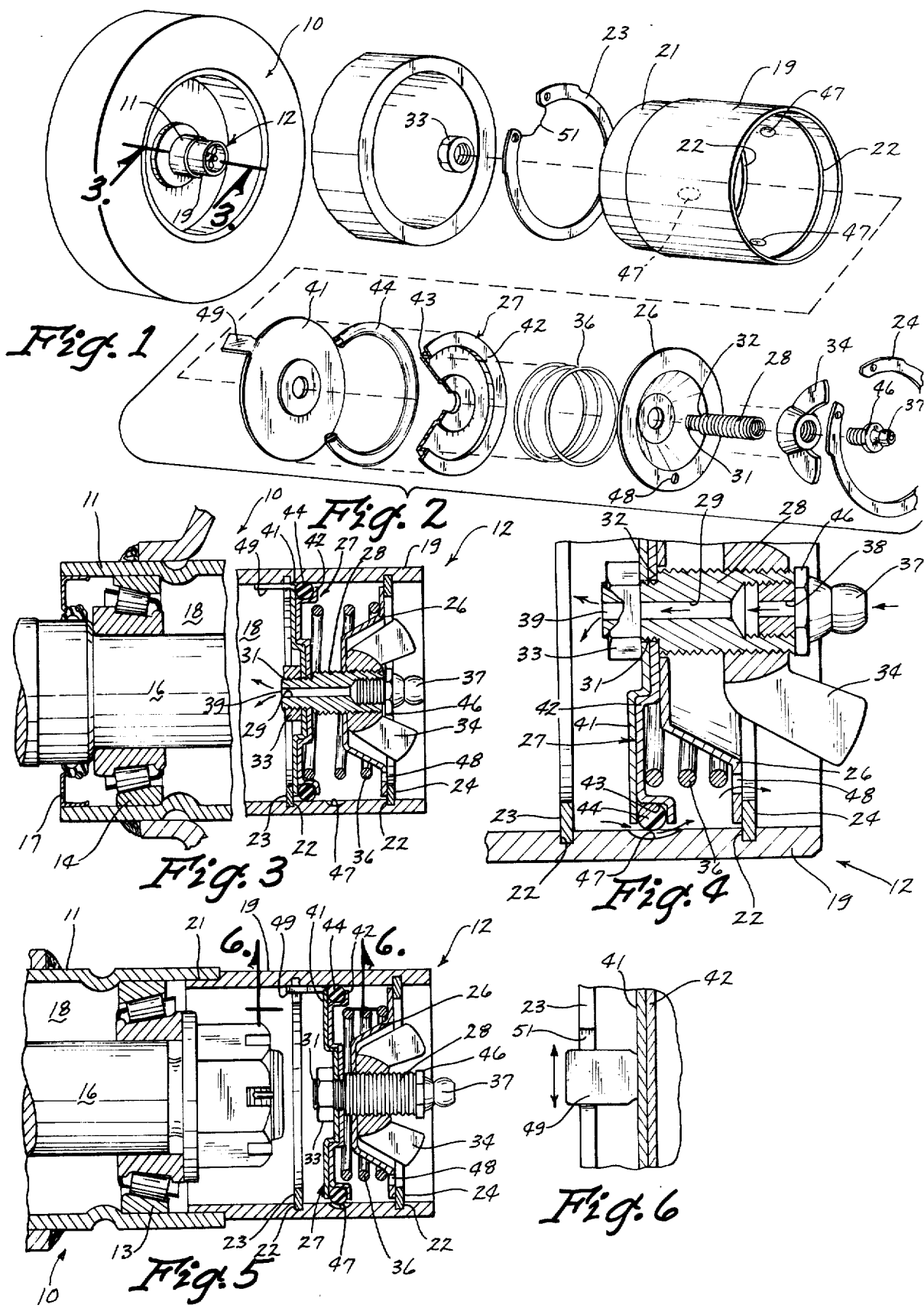

TRAILER HUB CAP DEVICE

SUMMARY OF THE INVENTION

The hub cap device of this invention is of a compact design and efficient in operation to positively grease seal a trailer wheel hub under a positive pressure against the entrance of water into the hub when the hub is submerged during boat launching and loading operations. This positive pressure is removed when the trailer is on the road so as to eliminate the building up of any over-pressures within the hub and the unnecessary bleeding of grease to the atmosphere that may occur from a normal heating of the wheel hub. As a result of removing a positive pressure from acting on the grease during trailer road travel, the amount of grease within the wheel hub is maintained substantially constant. Thus when the hub is to be submerged, and the positive pressure is applied to the grease therein, the hub is capable of being effectively sealed against the entrance of water. The application of removal of the positive pressure as provided by the spring loaded piston is simply and quickly accomplished by the manual manipulation of the actuator which is located exteriorly of the hub cap device.

BRIEF DESCRIPTION OF THE DRAWINGS

FIG. 1 is a perspective view of a boat trailer wheel assembly which embodies the hub cap device of this invention;

FIG. 2 is an exploded perspective view of the hub cap device;

FIG. 3 is an enlarged sectional view as seen on the line 3—3 in FIG. 1 showing the hub cap device with the piston thereof in its inner position;

FIG. 4 is an enlarged detail sectional view showing the piston of the hub cap device in the grease bleeding or outer position therefor;

FIG. 5 is illustrated similarly to FIG. 3 and shows the spring load removed from the piston; and FIG. 6 is an enlarged detail view as seen on the line 6—6 of FIG. 5.

DETAILED DESCRIPTION OF THE INVENTION

With reference to the drawing, the hub cap device 10 of this invention is illustrated in FIG. 1 in assembly relation with the hub 11 of an axle and wheel unit 12, for a boat trailer or the like (not shown). The hub 11 (FIGS. 3 and 5) is rotatably supported on bearings 13 and 14 mounted on a spindle or shaft 16. A seal 17 adjacent the inner bearing 14 seals the inner end of the chamber 18 within the hub 11.

The hub cap device 10 includes a cylindrical housing 19 (FIGS. 2 and 3) having an inner end formed with a shoulder 21 that is in a press or tight fit within the outer end of the wheel hub 11 so as to constitute an extension of the wheel hub. Formed in the inner peripheral surface of the housing 19 are a pair of axially spaced annular grooves 22 for receiving therein a pair of corresponding retaining rings 23 and 24 which project inwardly of the housing and which for convenience will be hereinafter referred to as an inner ring and an outer ring, respectively. Arranged between the retaining rings 23 and 24 are a spring plate 26 and a piston 27, with the plate 26 being movable into engagement with the outer ring 24 and the piston with the inner ring 23.

Secured to the piston 27 and projected axially thereof in on direction through the spring plate 26 is an externally threaded center bolt or piston rod 28 that has an axial bore or grease passage 29. The bolt has an inner section 31 of a reduced diameter to form a shoulder 32. With the reduced section 31 of the piston rod 28 projected through the piston 27 a nut 33 threadable on the reduced section 31 clamps the piston 27 against the shoulder 32 for rigid attachment to the piston rod 28.

A wing nut 34 threadable on the piston rod 28, outwardly from the spring plate 26, is engageable with the outer surface of the spring plate to permit adjustable movement of such plate toward and away from the piston 27. This adjustment is made relative to the action or pressure exerted by a coil spring 36 mounted about the piston rod 28 and arranged in compression between the piston 27 and the spring plate 26. Threadably secured within and extended axially from the outer end of the piston rod 28 is a conventional type grease fitting 37. An axial bore 38 in the fitting 37 is open to and in axial alignment with the bore 29 in the piston rod 28 so as to form therewith a continuous grease passage that has an outlet 39 open to the chamber 18 of the hub 11.

The piston 27 is comprised of a pair of disc like members 41 and 42, the outer peripheral portions of which are relatively constructed to form a circumferential groove 43 to receive an O-ring 44 in sealing engagement with the inner peripheral surface of the housing 19. The seal 17 adjacent the bearing 14 thus forms a stationary seal for the inner end of the hub chamber 18 and the piston 27 an axially movable seal for the outer end of the hub chamber.

In the use of the hub device 10, grease is initially admitted under pressure to the grease fitting 37 for flow through the bores 29 and 38 into the hub chamber 18. During this grease filling operation the coil spring 36 may be in either the collapsed position thereof as shown in FIG. 5, wherein the spring plate 26 has been adjustably moved adjacent the piston 27 by tightening the wing nut 34 on the piston rod 28; or in the extended position thereof shown in FIG. 3 wherein the wing nut 34 is in a fully loosened or retracted position. This retracted position of the wing nut 34 is defined by the engagement thereof with the nut portion 46 of the grease fitting 37. This retaining action of the grease fitting relative to the wing nut 34 requires the wing nut to be mounted on the piston rod 28 prior to the assembly therewith of the grease fitting 37.

Grease under pressure is supplied to the hub chamber 18 until the piston 27 is moved away from the inner retaining ring 23 to a grease bleeding position of the sealing O-ring 44 wherein the O-ring is opposite a series of circumferentially spaced notches or recesses 47 formed in the inner peripheral surface of the housing 19 substantially intermediate the retaining rings 23 and 24 (FIG. 4). Each of the recesses 47 is of a length axially of the housing 19 greater than the diameter of the O-ring 44. Thus, with the O-ring 44 opposite the recesses 47, each recess forms a by-pass passage about the O-ring permitting grease to flow from within the hub chamber 18 into the space between the spring plate 26 and piston 27 and through a bleed opening 48 in the plate 26 to the atmosphere. Since the bleeding of the excess grease through the opening 48 is visually observable, there is provided a visual indication of a grease filled condition of the hub chamber 18.

When the trailer (not shown), of which the axle and wheel unit 12 forms a part, is to be moved into water for the purpose of launching or loading a boat the wing nut 34 is adjusted to its retracted position shown in FIG. 3 providing for the coil spring 36 applying the full pressure thereof against the piston 27 to in turn apply a positive pressure on the grease within the hub chamber 18. The piston 27 is movable by the spring 36 to an innermost position defined by the engagement thereof with the inner retaining ring 23. The spring loaded piston 27 thus functions to maintain a positive pressure on the grease within the hub chamber 18 to counteract any tendency of water to enter the hub cap during the immersion period of the wheel and axle unit 12.

To condition the axle and wheel unit 12 for a road travel of the trailer, the wing nut 34 is adjusted to its innermost tightened position shown in FIG. 5 whereby to reduce or eliminate the application of a positive pressure on the grease within the hub chamber 18. Thus, as a result of the expansion of the grease by a normal heating of the hub 11 during road travel, the grease is permitted to expand freely since the collapsed spring 36 offers no resistance to a free movement of the piston 27 between the retaining rings 23 and 24. As a result, any loss of grease resulting from a normal heating of the hub is substantially eliminated so that a substantially constant volume of grease is maintained within the hub chamber 18. Thus, on a retraction of the wing nut 33 to its stop position against the nut portion 46 of the grease fitting, the spring is effective to exert a positive pressure on the grease within the wheel hub.

To assure the wing nut 34 being operable at all times to vary the action of the spring relative to the piston 27, the inner disc 41 of the piston is integrally formed with a laterally extended lug or abutment member 49 (FIGS. 2, 5 and 6). This abutment is of a length to extend within the space 51 between the adjacent ends of the inner retaining ring 23 for all moved positions of the piston 27. Thus, for reversed rotational movements of the wing nut 34 the abutment 49 is engageable with one or the other of the ends of the retaining ring 23. A locking of the nut 34 in either one of its extreme adjusted positions is eliminated by virtue of the limited rotational movement of the piston 27 within the housing 19 as defined by the circumferential extent of the space 51 of the retaining ring 23.

It is also to be noted that the axial projection of the grease fitting 37 is substantially within the confines of the housing 19 so as to appreciably reduce any accidental injury to the grease fitting. Additionally, it is seen that the wing nut 34 is immediately accessible to the exterior of the hub chamber 18 for convenient and simple manipulation for control of the action of the coil spring 36.

Although the invention has been described with respect to a preferred embodiment thereof, it is to be understood that it is not to be so limited since changes and modifications can be made therein which are within the full intended scope of this invention as defined by the appended claims.

We claim:
1. A hub cap device for a wheel and axle unit having a hub member comprising:
  a. a cylindrical housing having one end open for attachment to said hub member;
  b. a piston within said housing having a peripheral sealing means in sealing engagement with the inner peripheral surface of said housing;
  c. means for limiting the movement of said piston axially of said housing between a first inner position and a second outer position therefor, including a pair of projections axially spaced on the inner peripheral surface of said housing,
  d. means for filling said hub member with grease under pressure,
  e. means for yieldably urging said piston toward the inner position therefor to apply a positive pressure on the grease in said hub member,
  f. means for bleeding grease from said hub member when the piston is in the outer position therefor,
  g. manually operated means for adjusting the effective action of said yieldable means on said piston, adjustable to a first position wherein said yieldable means has a maximum effective action for urging said piston toward the inner position therefor and to a second position wherein the yieldable means is rendered ineffective to urge the piston toward said inner position therefor, and
  h. coacting guide means on said piston and on one of said projections for holding said piston against rotational movement within said housing,
  i. said piston, manually operated means, and yieldable means, when the yieldable means is in the second position therefor, being freely movable together as a unit axially of said housing between the inner and outer positions for said piston.

2. The hub cap device according to claim 1 wherein:
  a. said piston includes an externally threaded tubular stem member and said yieldable means comprises a coil spring mounted about said stem member to one side of said piston,
  b. said manually operated means includes a disc member, engageable with the other one of said annular projections when the spring is extended, and adjustably movable on said stem member to compress said spring against said one side of the piston, and
  c. a rotatable adjustable member threadable on said stem for adjustably moving said disc member,
  d. said means for filling the hub member with grease under pressure including a grease fitting secured to said stem member and constituting a stop member to prevent rotation of said adjustable member in one direction out of threadable engagement with said stem.

* * * * *